US010480545B2

(12) United States Patent
Huh (10) Patent No.: US 10,480,545 B2
(45) Date of Patent: Nov. 19, 2019

(54) DIAPHRAGM TYPE ACTUATOR (71) Applicant: IHI Corporation, Koto-ku (JP)

(72) Inventor: Jaemin Huh, Koto-ku (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 15/545,031

(22) PCT Filed: Mar. 11, 2016

(86) PCT No.: PCT/JP2016/057829
§ 371 (c)(1),
(2) Date: Jul. 20, 2017

(87) PCT Pub. No.: WO2016/158323
PCT Pub. Date: Oct. 6, 2016

(65) Prior Publication Data
US 2018/0010620 A1  Jan. 11, 2018

(30) Foreign Application Priority Data
Mar. 31, 2015  (JP) .................. 2015-071805

(51) Int. Cl.
*F15B 15/10*  (2006.01)
*F16K 31/126*  (2006.01)
(Continued)

(52) U.S. Cl.
CPC .......... *F15B 15/10* (2013.01); *F16K 31/1262* (2013.01); *F02B 37/186* (2013.01); *F16F 15/08* (2013.01)

(58) Field of Classification Search
CPC ................. F15B 15/10; F15B 15/08
(Continued)

(56) References Cited

U.S. PATENT DOCUMENTS 3,648,571 A     3/1972  Burgess
4,377,070 A *   3/1983  Shadbourne .......... F02B 37/186
                                                    60/602
5,377,579 A     1/1995  Pierce

FOREIGN PATENT DOCUMENTS

CN   202082186 U   12/2011
CN   203476886 U    3/2014
(Continued)

OTHER PUBLICATIONS

Machine Translation of JP2005-299812.*

*Primary Examiner* — Michael Leslie
*Assistant Examiner* — Daniel S Collins
(74) *Attorney, Agent, or Firm* — Oblon, McClelland, Maier & Neustadt, L.L.P.

(57) ABSTRACT

Provided is a diaphragm type actuator that drives an operation rod in an axial direction of the operation rod, including: a diaphragm which is connected to the operation rod; a low pressure chamber which is adjacent to one end side of the diaphragm in the axial direction; a high pressure chamber which is adjacent to the other end side of the diaphragm in the axial direction; a return spring which is provided in the low pressure chamber and urges the diaphragm toward the high pressure chamber; and a retainer which is provided on a surface near the high pressure chamber in the diaphragm. An elastic member is disposed inside the high pressure chamber and the elastic member is disposed between a retainer and a wall surface facing the retainer in the axial direction.

6 Claims, 7 Drawing Sheets

(51) Int. Cl.
*F02B 37/18* (2006.01)
*F16F 15/08* (2006.01)

(58) Field of Classification Search
USPC .................................................. 92/96, 85 R
See application file for complete search history.

(56) References Cited

FOREIGN PATENT DOCUMENTS

| | | | |
|---|---|---|---|
| CN | 203742771 U | 7/2014 | |
| DE | 25 09 138 A1 | 9/1976 | |
| DE | 10 2007 018 618 A1 | 10/2007 | |
| EP | 2 363 610 A1 | 9/2011 | |
| FR | 2 993 943 A1 | 1/2014 | |
| JP | 55-55606 U1 | 10/1978 | |
| JP | 60-49302 U | 4/1985 | |
| JP | 63-166704 U | 10/1988 | |
| JP | 1-238703 A | 9/1989 | |
| JP | 2-22402 U | 2/1990 | |
| JP | 3-50327 A | 3/1991 | |
| JP | 7-269512 A | 10/1995 | |
| JP | 8-296448 A | 11/1996 | |
| JP | 2853053 B2 | 2/1999 | |
| JP | 2005299812 * | 10/2005 | .............. F15B 15/10 |
| JP | 2005-325932 A | 11/2005 | |
| JP | 2011-169298 A | 9/2011 | |
| JP | 2015-94313 A | 5/2015 | |

\* cited by examiner

DIAPHRAGM TYPE ACTUATOR

TECHNICAL FIELD

The disclosure relates to a diaphragm type actuator.

BACKGROUND ART

Conventionally, for example, a diaphragm type actuator is employed as an actuator that opens and closes a valve body of a waste gate valve of a turbocharger of an engine (for example, see Patent Literature 1). The diaphragm type actuator includes an operation rod which is connected to a valve body, a diaphragm which drives the operation rod, a low pressure chamber and a high pressure chamber which are adjacent to each other with the diaphragm interposed therebetween in the axial direction of the operation rod, and a return spring which is disposed inside the low pressure chamber and urges the diaphragm.

CITATION LIST

Patent Literature

Patent Literature 1: Japanese Unexamined Patent Publication No. H7-269512

SUMMARY OF INVENTION

Technical Problem

For example, there is a case in which the valve body of the waste gate valve is vibrated due to a change in pressure inside a housing of the turbocharger when the waste gate valve is opened during the operation of the turbocharger. When the valve body is vibrated, the operation rod connected to the valve body is also vibrated.

The disclosure describes the diaphragm-type actuator capable of suppressing the vibration of the operation rod.

Solution to Problem

According to an aspect of the disclosure, provided is a diaphragm-type actuator that drives an operation rod in an axial direction of the operation rod, including: a diaphragm which is connected to the operation rod; a low pressure chamber which is adjacent to one end side of the diaphragm in the axial direction; a high pressure chamber which is adjacent to the other end side of the diaphragm in the axial direction; a return spring which is provided in the low pressure chamber and urges the diaphragm toward the high pressure chamber; a retainer which is provided on a surface near the high pressure chamber in the diaphragm; and an elastic member that is disposed between the retainer and a wall surface facing the retainer in the axial direction inside the high pressure chamber.

Effects of Invention

According to an aspect of the disclosure, since it is possible to suppress the retainer and the diaphragm from being vibrated by the elastic member, it is possible to suppress the vibration of the operation rod connected to the diaphragm.

DESCRIPTION OF EMBODIMENTS

According to an aspect of the disclosure, provided is a diaphragm-type actuator that drives an operation rod in an axial direction of the operation rod, including: a diaphragm which is connected to the operation rod; a low pressure chamber which is adjacent to one end side of the diaphragm in the axial direction; a high pressure chamber which is adjacent to the other end side of the diaphragm in the axial direction; a return spring which is provided in the low pressure chamber and urges the diaphragm toward the high pressure chamber; a retainer which is provided on a surface near the high pressure chamber in the diaphragm; and an elastic member that is disposed between the retainer and a wall surface facing the retainer in the axial direction inside the high pressure chamber.

In the diaphragm-type actuator, when a pressure inside the low pressure chamber increases from a low pressure state, the return spring urges the diaphragm to move toward the high pressure chamber and the operation rod is driven toward the other end side. In the diaphragm-type actuator, the elastic member is disposed between the retainer provided on a surface near the high pressure chamber in the diaphragm and a wall surface facing the retainer inside the high pressure chamber. Accordingly, when the diaphragm moves toward the high pressure chamber, the elastic member is sandwiched between the retainer and the wall surface facing the retainer. For that reason, the vibration of the retainer and the diaphragm is suppressed by the elastic member. As a result, the vibration of the operation rod connected to the diaphragm is suppressed.

The retainer may be provided with a rim protruding into the high pressure chamber in the axial direction, and the elastic member may be disposed to face the rim in the axial direction. According to this configuration, since the retainer is provided with the rim, the rigidity of the retainer is improved. Further, since the elastic member is disposed to face the rim of the retainer, the rim and the elastic member contact each other when the diaphragm moves toward the high pressure chamber. Accordingly, it is possible to prevent the contact between the rim and the wall surface facing the rim in the axial direction and to suppress the vibration of the retainer, the diaphragm, and the operation rod by the elastic member.

The elastic member may be attached to the wall surface which is an inner surface of a wall body facing the retainer of the high pressure chamber. Accordingly, it is possible to stably support the elastic member by the wall body of the high pressure chamber. Further, since the elastic member is attached to the surface near the retainer of the wall body of the high pressure chamber, the retainer and the elastic member contact each other when the diaphragm moves toward the high pressure chamber. Thus, it is possible to prevent the contact between the retainer and the wall body of the high pressure chamber in the axial direction and to suppress the vibration of the retainer, the diaphragm, and the operation rod by the elastic member. Further, since the wall body of the high pressure chamber is provided with the elastic member, it is possible to suppress the vibration of the diaphragm-type actuator by changing the natural frequency of the diaphragm-type actuator and to suppress the vibration of the operation rod.

The operation rod may extend from the diaphragm toward the high pressure chamber and penetrate a wall body facing the retainer of the high pressure chamber in the axial direction, a bearing portion holding the operation rod may be supported by the wall body, the bearing portion may protrude from the wall body into the high pressure chamber, and the elastic member may be attached to the wall surface which is a surface near the retainer in the bearing portion. Accordingly, since the bearing portion supporting the operation rod is disposed inside the high pressure chamber, the bearing portion cannot protrude toward the outside of the high pressure chamber. Accordingly, it is possible to save the space of the diaphragm-type actuator. Further, since the elastic member is attached to the surface near the retainer of the bearing portion protruding inward the high pressure chamber, the retainer and the elastic member contact each other when the diaphragm moves toward the high pressure chamber. Accordingly, it is possible to prevent the contact between the retainer and the wall body of the high pressure chamber in the axial direction and to suppress the vibration of the retainer, the diaphragm, and the operation rod by the elastic member. Further, since the elastic member is attached to the bearing portion protruding from the wall body of the high pressure chamber, it is possible to suppress the vibration of the diaphragm-type actuator by changing the natural frequency of the diaphragm-type actuator and to suppress the vibration of the operation rod.

The elastic member may be formed by a rubber member and include a plate-shaped portion which is disposed to face the retainer in the axial direction, and a plate thickness direction of the plate-shaped portion may be disposed to follow the axial direction. According to this configuration, it is possible to suppress an increase in space for installing the elastic member and to suppress the vibration of the retainer, the diaphragm, and the operation rod while suppressing a decrease in movement range of the diaphragm.

The elastic member may include an extension portion which extends from the plate-shaped portion toward the other end side. According to this configuration, since the extension portion contacts the wall body of the high pressure chamber, the plate-shaped portion is disposed to be separated from the wall body of the high pressure chamber in the axial direction. Then, when the diaphragm moves toward the high pressure chamber, the retainer contacts the plate-shaped portion formed by the rubber member, so that the vibration of the retainer, the diaphragm, and the operation rod can be suppressed.

Hereinafter, embodiments of the disclosure will be described in detail with reference to the drawings. In each drawing, the same or corresponding components will be indicated by the same reference numerals, and redundant description will be omitted.

(Supercharger)

Figure 1:
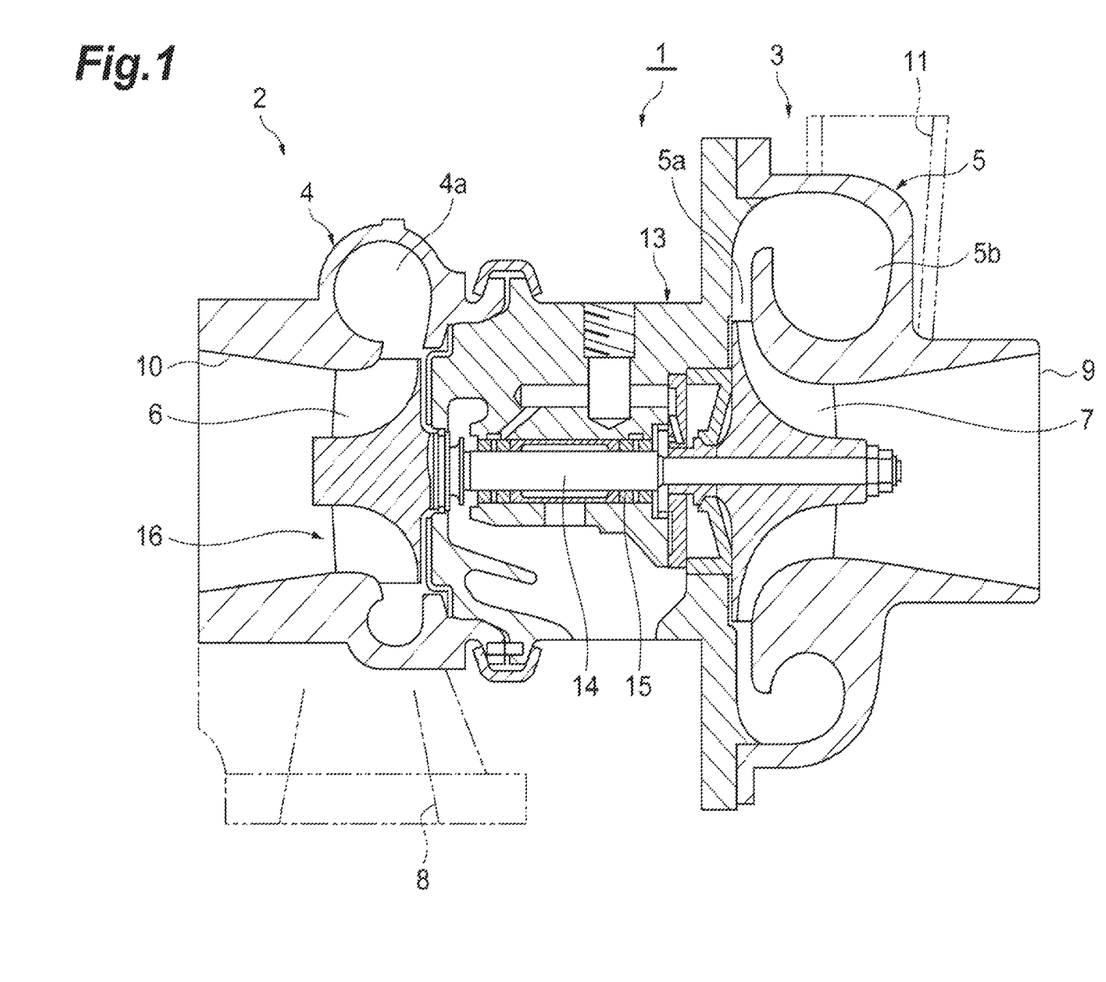
FIG. 1 is a cross-sectional view illustrating a vehicle supercharger including a diaphragm-type actuator according to an embodiment of the disclosure.
Figure 2:
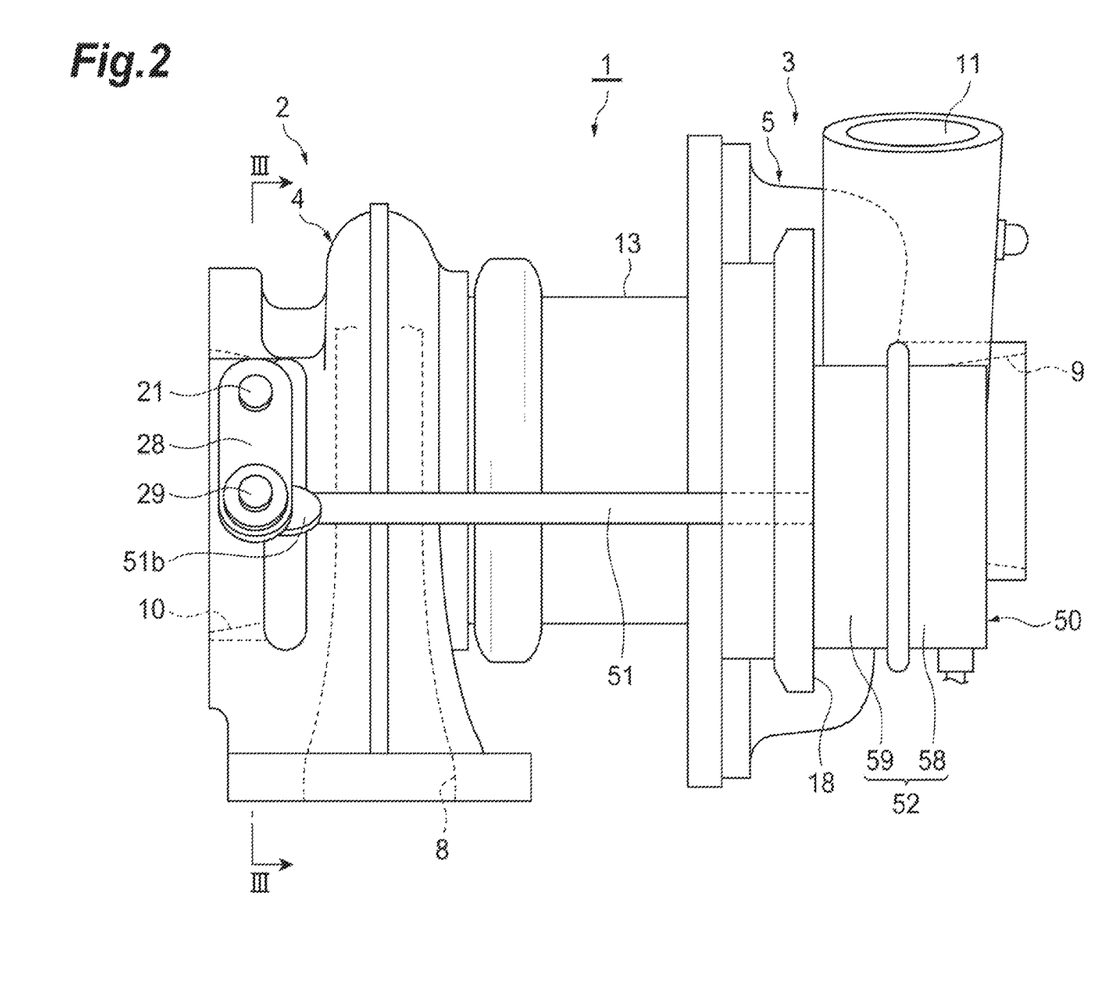
FIG. 2 is a side view of the vehicle supercharger illustrated in FIG. 1 and is a diagram illustrating the diaphragm-type actuator attached to a side surface of the vehicle supercharger.
Figure 3:
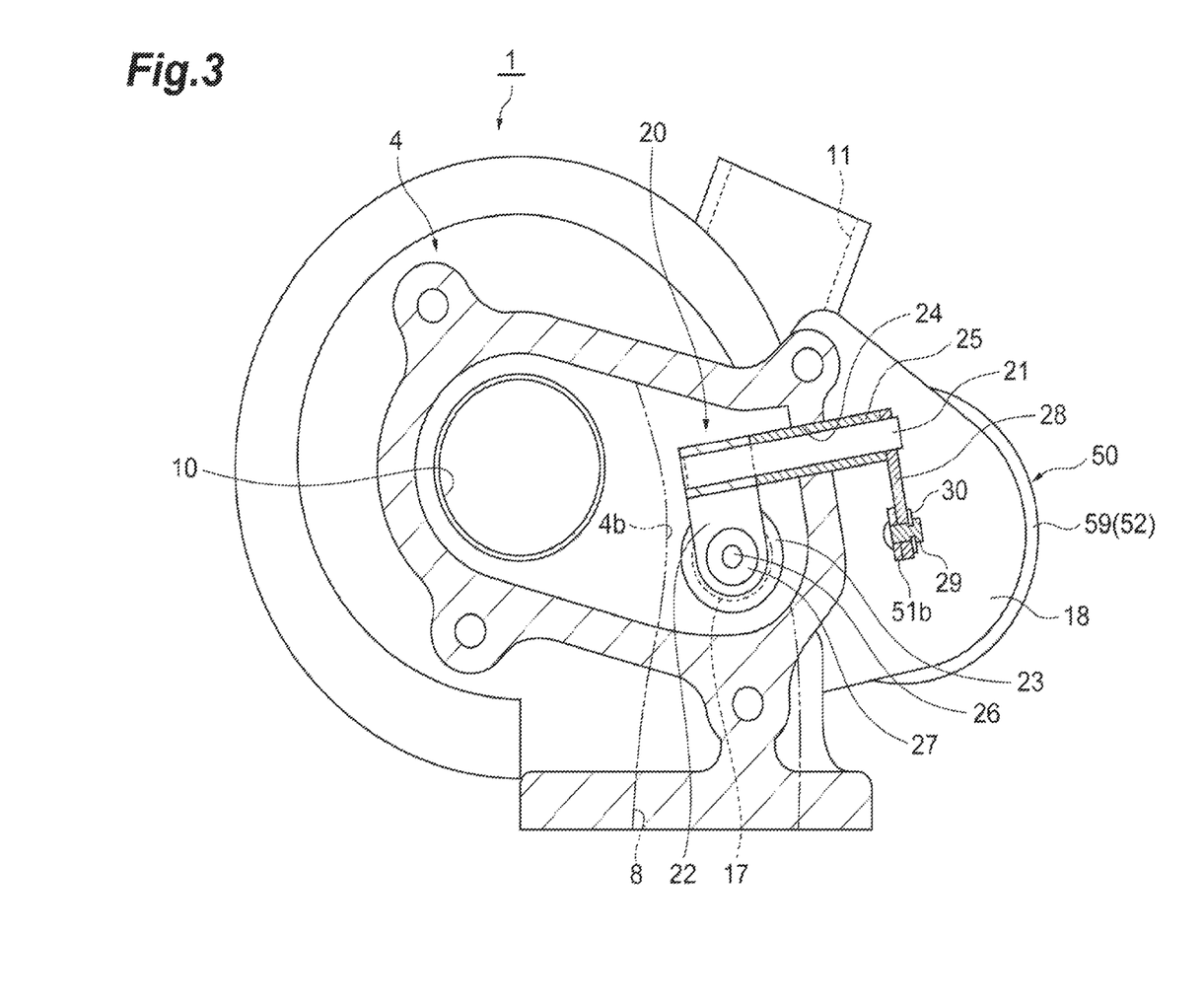
FIG. 3 is a cross-sectional view taken along a line 111411 of FIG. 2.

A supercharger 1 illustrated in FIGS. 1 to 3 is a vehicle supercharger and is used to compress air supplied to an engine (not illustrated) by using an exhaust gas discharged from the engine. The supercharger 1 includes a diaphragm-type actuator 50 which opens and closes a waste gate valve 20 illustrated in FIG. 3. The supercharger 1 includes a turbine 2 and a compressor (a centrifugal compressor) 3. The turbine 2 includes a turbine housing 4 and a turbine impeller 6 received in the turbine housing 4. The compressor 3 includes a compressor housing 5 and a compressor impeller 7 received in the compressor housing 5.

The turbine impeller 6 is provided at one end of a rotation shaft 14 and the compressor impeller 7 is provided at the other end of the rotation shaft 14. A bearing housing 13 is provided at a space between the turbine housing 4 and the compressor housing 5. The rotation shaft (the rotor shaft) 14 is rotatably supported by the bearing housing 13 through a bearing 15. The supercharger 1 includes a turbine rotor shaft 16 and the turbine rotor shaft 16 includes the rotation shaft 14 and the turbine impeller 6 provided at one end of the rotation shaft 14. The turbine rotor shaft 16 and the compressor impeller 7 rotate as a single rotation body.

The turbine housing 4 is provided with an exhaust gas inlet 8 and an exhaust gas outlet 10. An exhaust gas discharged from the engine flows into the turbine housing 4 through the exhaust gas inlet 8 to rotate the turbine impeller 6 and flows to the outside of the turbine housing 4 through the exhaust gas outlet 10.

The compressor housing 5 is provided with a suction port 9 and an ejection port 11. When the turbine impeller 6 rotates as described above, the turbine rotor shaft 16 and the compressor impeller 7 rotate. The rotating compressor impeller 7 suctions external air through the suction port 9, compresses the air, and ejects the air from the ejection port 11. The compressed air which is ejected from the ejection port 11 is supplied to the engine.

As illustrated in FIGS. 1 and 3, a bypass passage (see FIG. 3) 17 which guides a part of the exhaust gas introduced from the exhaust gas inlet 8 toward the exhaust gas outlet 10 so that the exhaust gas bypasses the turbine impeller 6 is formed inside the turbine housing 4. The bypass passage 17 is a variable gas passage for changing the amount of the exhaust gas supplied to the turbine impeller 6.

(Waste Gate Valve)

The waste gate valve 20 which is one of flow rate changing valve mechanisms is provided inside the turbine housing 4. The waste gate valve 20 is a valve which opens and closes an opening portion of the bypass passage 17. The waste gate valve 20 includes a stem 21 which is rotatably supported by an outer wall of the turbine housing 4, a swing piece 22 which protrudes from the stem 21 in the radial direction of the stem 21, and a valve body 23 which is supported by the swing piece 22.

An outer wall of the turbine housing 4 is provided with a support hole 24 which penetrates the outer wall in the plate thickness direction. A cylindrical bush 25 is inserted through the support hole 24. The bush 25 is fixed to the outer wall of the turbine housing 4.

The stem 21 is inserted through the bush 25 and is rotatably supported by the outer wall of the turbine housing 4. The swing piece 22 is fixed to the stem 21. The stem 21 rotates about the axis of the stem 21 so that the swing piece 22 swings. A front end of the swing piece 22 is provided with an attachment hole for attaching the valve body 23 thereto.

The valve body 23 is able to contact and separate from a circumferential edge of the opening portion of the bypass passage 17 and is formed in, for example, a disc shape. The valve body 23 is provided with a valve shaft 26 which protrudes toward the opposite side to the opening portion of the bypass passage 17. The valve shaft 26 is inserted through the attachment hole of the front end of the swing piece 22. A stopper 27 is fixed to art end opposite to the valve body 23 in the valve shaft 26 and the valve shaft 26 inserted through the attachment hole is held by the stopper 27. The valve body 23 is supported to be slightly movable (also in a tiltable manner) relative to the swing piece 22. Accordingly, since the valve body 23 slightly moves relative to the swing piece 22, the valve body 23 is in close contact with the circumferential edge of the opening portion of the bypass passage 17. Then, the valve body 23 contacts the circumferential edge of the opening portion of the bypass passage 17 so that the waste gate valve 20 is closed and the valve body 23 moves away from the circumferential edge of the opening portion of the bypass passage 17 so that the waste gate valve 20 is opened.

A plate-shaped link member 28 that protrudes in the radial direction of the stem 21 is fixed to an end disposed at the outside of the turbine housing 4 in the stem 21. A front end of the link member 28 is provided with an attachment hole through which the connection pin 29 is inserted and a connection pin 29 is inserted through the attachment hole. Further, the connection pin 29 is inserted through an attachment hole formed at the other end 51b of which is a front end of the operation rod 51 of the diaphragm-type actuator 50 to be described later. One end of the connection pin 29 is fixed to the operation rod 51 by caulking. A clip 30 is attached to the other end of the connection pin 29 to prevent the separation of the connection pin 29 from the attachment hole. The stem 21 is connected to the operation rod 51 of the diaphragm-type actuator 50 through the link member 28 and the connection pin 29.

(Diaphragm-Type Actuator)

Next, the diaphragm-type actuator 50 will be described. As illustrated in FIGS. 2 and 3, the diaphragm-type actuator 50 is fixed to a bracket 18 protruding laterally from the compressor housing 5.

Figure 4:
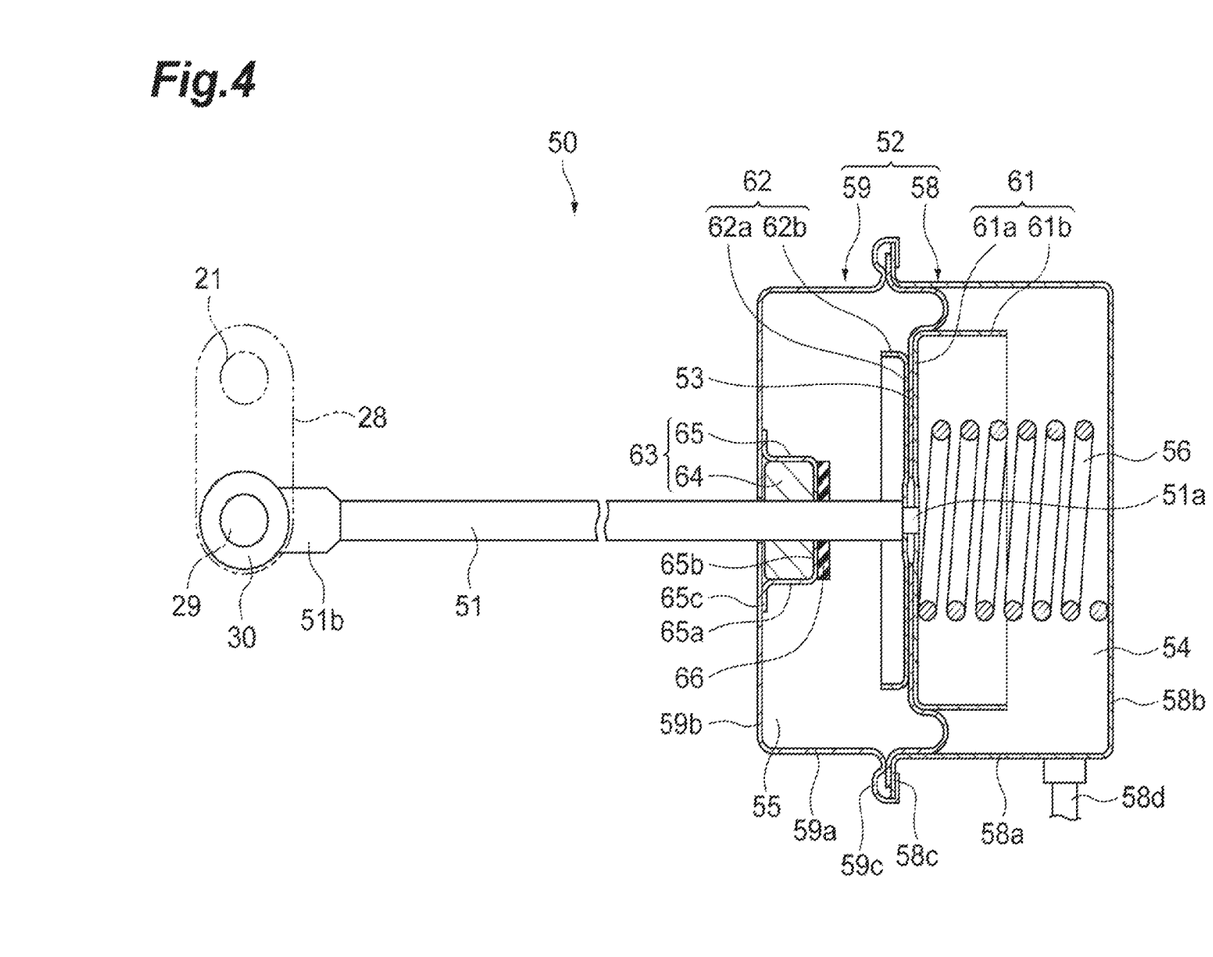
FIG. 4 is a cross-sectional view of a diaphragm-type actuator according to a first embodiment of the disclosure.

As illustrated in FIG. 4, the diaphragm-type actuator 50 includes an operation rod 51 and an actuator body 52 which drives the operation rod 51 in the axial direction. The actuator body 52 includes a diaphragm 53 which is connected to the operation rod 51 and transmits driving power to the operation rod 51, a low pressure chamber 54 which is adjacent to one side of the diaphragm 53, a high pressure chamber 55 which is adjacent to the other side of the diaphragm 53, and a return spring 56 which is provided inside the low pressure chamber 54 and urges the diaphragm 53 toward the high pressure chamber 55. In other words, the low pressure chamber 54 and the high pressure chamber 55 are provided with the diaphragm 53 interposed therebetween and the return spring 56 urges the diaphragm 53 toward the high pressure chamber 55. The operation rod 51 is a rod-shaped member that is driven by the actuator body 52.

The actuator body 52 includes a low pressure side cup portion 58 which forms the low pressure chamber 54 therein and a high pressure side cup portion 59 which forms the high pressure chamber 55 therein. The low pressure side cup portion 58 and the high pressure side cup portion 59 are formed of metal such as iron. The low pressure side cup portion 58 includes a cylindrical portion 58a and a rear wall 58b which closes one end side (at the right side of the drawing) of the cylindrical portion 58a. The other end side of the cylindrical portion 58a is provided with a flange portion 58c which protrudes from the circumferential edge of the opening portion in the radial direction of the cylindrical portion 58a. Further, the cylindrical portion 58a is provided with a nozzle 58d. A negative pressure pump (not illustrated) capable of depressurizing a pressure inside the low pressure chamber 54 is connected to the nozzle 58d.

The high pressure side cup portion 59 includes a cylindrical portion 59a and a front wall (a wall body) 59b which closes the other end side (a left side in the drawing) of the cylindrical portion 59a. One end side of the cylindrical portion 59a is provided with a flange portion 59c which protrudes from the circumferential edge of the opening portion in the radial direction of the cylindrical portion 59a. The inner diameter of the cylindrical portion 59a of the high pressure side cup portion 59 corresponds to the inner diameter of the cylindrical portion 58a of the low pressure side cup portion 58. Further, the inner diameters of the cylindrical portions 58a and 59a may be the same as each other or different from each other. Further, a center portion of the front wall 59b is provided with an opening portion through which the operation rod 51 is inserted.

The low pressure side cup portion 58 and the high pressure side cup portion 59 are disposed so that both opening portions face each other with the diaphragm 53 interposed therebetween in the axial direction of the operation rod 51 and are bonded to each other. The diaphragm 53 is formed in, for example, a circular shape and a circumferential edge of the diaphragm 53 is sandwiched by the flange portions 58c and 59c of the low pressure side cup portion 58 and the high pressure side cup portion 59. The flange portions 58c and 59c of the low pressure side cup portion 58 and the high pressure side cup portion 59 are bonded to each other by, for example, caulking. The low pressure side cup portion 58 and the high pressure side cup portion 59 may be bonded to each other by, for example, welding, screwing, or other methods.

The diaphragm 53 has an outer diameter which is larger than the inner diameters of the cylindrical portions 58a and 59a. Inside the low pressure side cup portion 58 and the high pressure side cup portion 59, the center portion of the diaphragm 53 is movable in the axial direction of the operation rod 51.

One surface (at the right side of the drawing) of the diaphragm 53 is provided with a low pressure side retainer 61 and the other surface (at the left side of the drawing) of the diaphragm 53 is provided with the high pressure side retainer 62. The low pressure side retainer 61 and the high pressure side retainer 62 are formed of, for example, metal such as iron. The low pressure side retainer 61 includes a disc-shaped retainer body 61a which contacts one surface of the diaphragm 53 and a protrusion portion 61b which protrudes in the axial direction of the operation rod 51 from the outer circumferential edge of the retainer body 61a. The high pressure side retainer 62 includes a disc-shaped retainer body 62a which contacts the other surface of the diaphragm 53 and a protrusion portion (a rim) 62b which protrudes in the axial direction of the operation rod 51 from the outer circumferential edge of the retainer body 62a. The outer diameter of the retainer body 62a of the high pressure side retainer 62 is smaller than the outer diameter of the retainer body 61a of the low pressure side retainer 61. Further, each of the center portions of the retainer bodies 61a and 62a is provided with an opening portion.

One end 51a of the operation rod 51 is connected to the diaphragm 53. Specifically, one end 51a of the operation rod 51 is inserted through the opening portion of the high pressure side retainer 62, the opening portion of the diaphragm 53, and the opening portion of the low pressure side retainer 61 and is fixed to the high pressure side retainer 62 and the low pressure side retainer 61 by, for example, caulking. The high pressure side retainer 62 and the low pressure side retainer 61 support the center portion of the diaphragm 53 while sandwiching the center portion from both sides in the axial direction of the operation rod 51. Additionally, a method of connecting the operation rod 51 and the diaphragm 53 to each other is not limited to the connection method by caulking. For example, a connection method may be employed in which one end of the operation rod 51 is provided with a screw portion and a nut is fastened to the screw portion so that the operation rod 51 is connected to the diaphragm 53 through the high pressure side retainer 62 and the low pressure side retainer 61.

The return spring 56 is, for example, a compression coil spring, one end of the return spring 56 contacts the rear wall 58*b* of the low pressure side cup portion 58, and the other end of the return spring 56 contacts the retainer body 61*a* of the low pressure side retainer 61. The return spring 56 can be lengthened and compressed in the axial direction of the operation rod 51, and when the low pressure side retainer 61 is urged toward the high pressure chamber 55, the diaphragm 53 is urged toward the high pressure chamber 55.

The operation rod 51 extends from the diaphragm 53 toward the high pressure chamber 55, penetrates the front wall 59*b* of the high pressure side cup portion 59, and extends to the outside of the high pressure chamber 55. A bearing portion 63 which holds the operation rod 51 is provided at a position corresponding to the opening portion of the front wall 59*b*.

The bearing portion 63 includes a cylindrical bush 64 and a bush housing 65 which receives the bush 64. The bush housing 65 includes a cylindrical portion 65*a*, a rear wall (a wall body) 65*b*, and a flange portion 65*c*. The cylindrical portion 65*a* is disposed to cover an outer circumferential surface of the bush 64. The rear wall 65*b* is formed at one end side of the cylindrical portion 65*a* to protrude inward in the radial direction. A center portion of the rear wall 65*b* is provided with an opening portion through which the operation rod 51 is inserted. The rear wall 65*b* is disposed to cover an end surface at one end side of the bush 64.

The flange portion 65*c* is formed at the other end side of the cylindrical portion 65*a* to protrude outward in the radial direction. The flange portion 65*c* is fixed to an inner wall surface (an inner surface) of the front wall 59*b* of the high pressure side cup portion 59. The flange portion 65*c* is bonded to the high pressure side cup portion 59 by, for example, welding. The bush 64 is disposed between the front wall 59*b* of the high pressure side cup portion 59 and the rear wall 65*b* of the bush housing 65 in the axial direction of the operation rod 51.

The bush housing 65 is disposed to protrude inward from the front wall 59*b*. In other words, the rear wall 65*b* of the bush housing 65 is disposed at a position near the diaphragm 53 in relation to the front wall 59*b* of the high pressure side cup portion 59. The rear wall 65*b* of the bush housing 65 faces the high pressure side retainer 62 in the axial direction of the operation rod 51.

Here, the diaphragm-type actuator 50 includes an anti-vibration sheet (an elastic member) 66 between the high pressure side retainer 62 and the rear wall 65*b* of the bush housing 65 in the axial direction of the operation rod 51 inside the high pressure chamber 55.

The anti-vibration sheet 66 is, for example, an annular rubber plate (a plate-shaped portion). A center opening portion of the anti-vibration sheet 66 is an opening through which the operation rod 51 is inserted. The outer diameter of the anti-vibration sheet 66 corresponds to the outer diameter of the rear wall 65*b* of the bush housing 65. Further, the anti-vibration sheet 66 is disposed so that the plate thickness direction of the anti-vibration sheet 66 follows the axial direction of the operation rod 51. One surface of the anti-vibration sheet 66 is disposed to face the retainer body 62*a* of the high pressure side retainer 62 and the other surface of the anti-vibration sheet 66 is disposed to face the inner wall surface (the wall surface facing the retainer) of the rear wall 65*b* of the bush housing 65. The anti-vibration sheet 66 is attached to the inner wall surface of the rear wall 65*b* of the hush housing 65 by, for example, adhering.

The material of the anti-vibration sheet 66 is, for example, heat-resistant rubber such as silicone rubber or chloroprene rubber. The temperature inside the high pressure chamber 55 is, for example, about 100° C. in the use state of the supercharger 1.

Next, the operation and effect of the supercharger 1 will be described.

An exhaust gas which flows from the exhaust gas inlet 8 passes through the turbine scroll passage 4*a* and is supplied to the inlet side of the turbine impeller 6. A rotational force is generated by using the pressure of the exhaust gas supplied from the turbine impeller 6, so that the rotation shaft 14 and the compressor impeller 7 are rotated together with the turbine impeller 6. Accordingly, air suctioned from the suction port 9 of the compressor 3 is compressed by using the compressor impeller 7. The air compressed by the compressor impeller 7 passes through a diffuser passage 5*a* and a compressor scroll passage 5*b* and is discharged from the ejection port 11. The air discharged from the ejection port 11 is supplied to the engine.

For example, when a supercharging pressure (a pressure of air discharged from the ejection port 11) is lower than a setting pressure during the operation of the supercharger 1, a negative pressure is applied to the low pressure chamber 54 of the diaphragm-type actuator 50 by the negative pressure pump. At this time, a pressure inside the high pressure chamber 55 is higher than a pressure inside the low pressure chamber 54. Then, the diaphragm 53 is urged by the pressure inside the high pressure chamber 55 so that the center portion of the diaphragm 53 moves toward the low pressure chamber 54. The return spring 56 is compressed.

In a state where a negative pressure is applied to the low pressure chamber 54, the center portion of the diaphragm 53 approaches the rear wall 58*b* of the low pressure side cup portion 58. The operation rod 51 is pulled toward one end side in the axial direction and a tensile force caused by the operation rod 51 is transmitted to the valve body 23 through the link member 28 connected to the operation rod 51, the stem 21, and the swing piece 22. Accordingly, the valve body 23 is pressed against the circumferential edge of the opening portion of the bypass passage 17 and the waste gate valve 20 is closed. That is, in the turbine 2, an operation of bypassing the exhaust gas using the bypass passage 17 is not performed.

Then, when the supercharging pressure reaches the setting pressure during the operation of the supercharger 1, the application of the negative pressure using the negative pressure pump is stopped. Thus, a pressure inside the low pressure chamber 54 increases and the pressure inside the low pressure chamber 54 becomes close to a pressure inside the high pressure chamber 55. At this time, the compressed return spring 56 is lengthened, the diaphragm 53 is urged by the return spring 56, and the center portion of the diaphragm 53 moves toward the high pressure chamber 55.

When the center portion of the diaphragm 53 moves toward the high pressure chamber 55, the operation rod 51 moves toward the other end side in the axial direction in accordance with the movement of the center portion of the diaphragm 53. The operation rod 51 is pressed toward the other end side in the axial direction and an extruding force caused by the operation rod 51 is transmitted to the link member 28. The link member 28 swings about the center of the stem 21 and the swing piece 22 swings by the rotation of the stem 21 about the axis. Accordingly, the valve body 23 is separated from the circumferential edge of the opening portion of the bypass passage 17 and the waste gate valve 20 is opened. Accordingly, a part of the exhaust gas flowing from the exhaust gas inlet 8 passes through the bypass passage 17 and bypasses the turbine impeller 6. For that reason, it is possible to reduce the amount of the exhaust gas supplied to the turbine impeller 6.

When the center portion of the diaphragm 53 moves toward the high pressure chamber 55 to maximum while the waste gate valve 20 is opened, the retainer body 62a of the high pressure side retainer 62 contacts the anti-vibration sheet 66. In other words, the anti-vibration sheet 66 is sandwiched between the retainer body 62a and the rear wall 65b of the bush housing 65 in the axial direction of the operation rod 51.

In this state, for example, when the valve body 23 is vibrated, the vibration of the valve body 23 is transmitted to the swing piece 22, the stem 21, the link member 28, the operation rod 51, the diaphragm 53, and the high pressure side retainer 62, but the vibration of the high pressure side retainer 62 is reduced by the anti-vibration sheet 66. Accordingly, since the vibration of the high pressure side retainer 62 is suppressed, the vibration of the diaphragm 53, the operation rod 51, the link member 28, the stem 21, the swing piece 22, and the valve body 23 is suppressed.

In the diaphragm-type actuator 50, since the anti-vibration sheet 66 is attached to the inner wall surface of the rear wall 65b of the bush housing 65, the contact between the high pressure side retainer 62 and the rear wall 65b is prevented. For that reason, there is no need to worry about abnormal noise caused by the hitting between the high pressure side retainer 62 and the rear wall 65b. Further, since the bush housing 65 protrudes toward the high pressure side retainer 62 in relation to the front wall 59b of the high pressure side cup portion 59, the high pressure side retainer 62 hits the anti-vibration sheet 66 before the high pressure side retainer 62 hits the front wall 59b. For that reason, there is no need to worry about abnormal noise caused by the hitting between the high pressure side retainer 62 and the high pressure side cup portion 59.

In the diaphragm-type actuator 50, since the anti-vibration sheet 66 is attached to the bush housing 65, the natural frequency of the actuator body 52 can be changed. Thus, it is possible to suppress the vibration of the actuator body 52 and to suppress the vibration of the operation rod 51. Accordingly, it is possible to suppress the vibration of the operation rod 51 and to suppress the vibration of the valve body 23.

Second Embodiment

Figure 5:
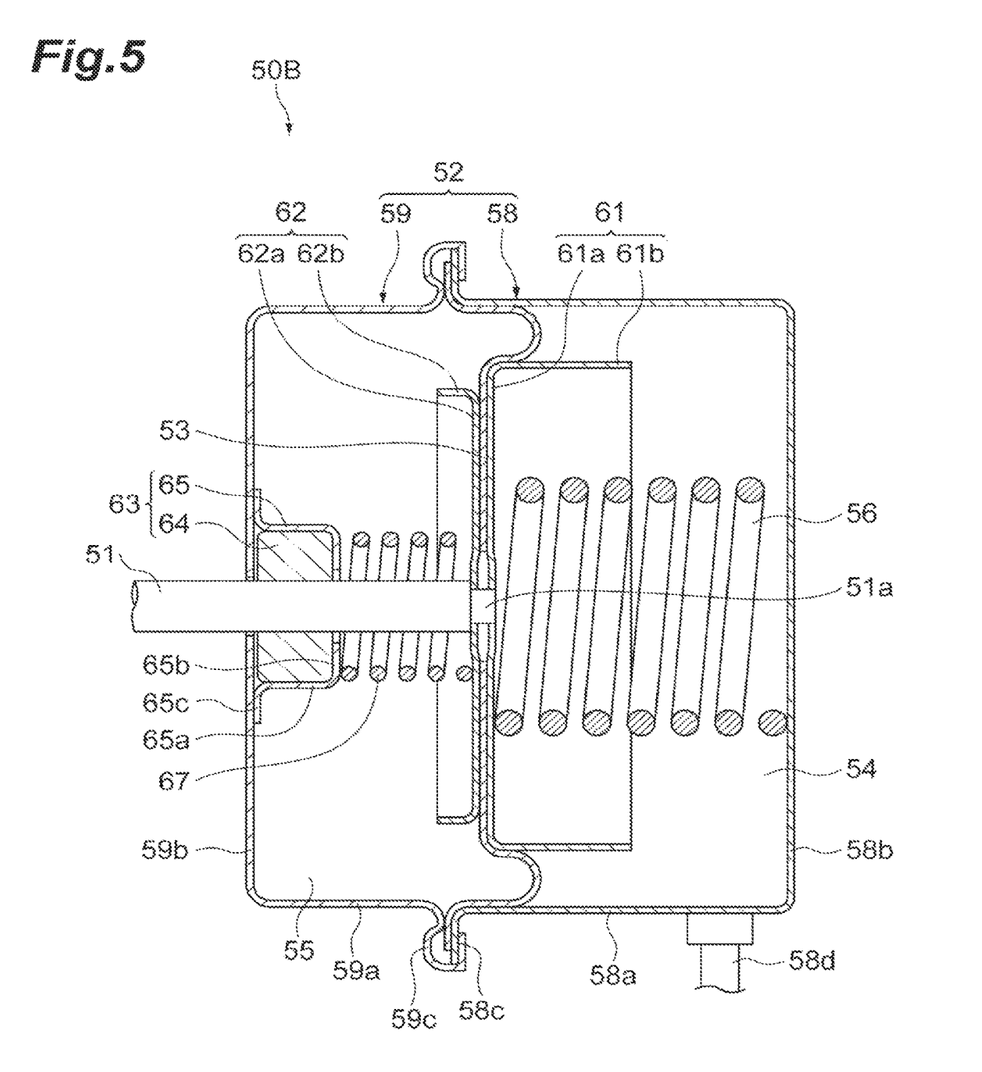
FIG. 5 is a cross-sectional view of a diaphragm-type actuator according to a second embodiment of the disclosure.

Next, a diaphragm-type actuator SOB according to a second embodiment will be described with reference to FIG. 5. The diaphragm-type actuator 50B according to the second embodiment is different from the diaphragm-type actuator 50 according to the first embodiment in that a compression coil spring (an elastic member) 67 is provided instead of the anti-vibration sheet 66. Further, in the description of the second embodiment, the same description as that of the first embodiment will be omitted.

The compression coil spring 67 is disposed between the rear wall 65b of the bush housing 65 and the retainer body 62a in the axial direction of the operation rod 51. The compression coil spring 67 is disposed to be coaxial to the operation rod 51, one end of the compression coil spring 67 contacts the retainer body 62a, and the other end of the compression coil spring 67 contacts the wall surface of the rear wall 65b.

The outer diameter of the compression coil spring 67 corresponds to, for example, the outer diameter of the rear wall 65b. A spring constant of the compression coil spring 67 is smaller than a spring constant of the return spring 56 disposed inside the low pressure chamber 54 and is, for example, 1/10 to 1/5 of the spring constant of the return spring 56. For example, when a pressure inside the high pressure chamber 55 is the same as a pressure inside the low pressure chamber 54, the center portion of the diaphragm 53 is urged by the return spring 56 to move toward the high pressure chamber 55 and the compression coil spring 67 is compressed.

According to the diaphragm-type actuator SOB of the second embodiment, when the valve body 23 is vibrated so that the vibration is transmitted to the diaphragm 53 and the high pressure side retainer 62, the vibration of the high pressure side retainer 62 and the diaphragm 53 is reduced by the compression coil spring 67 so that the vibration of the operation rod 51 is suppressed. For that reason, the vibration of the valve body 23 of the diaphragm-type actuator 50 is suppressed.

In the diaphragm-type actuator 50B, since the high pressure side retainer 62 and the compression coil spring 67 contact each other even when the valve is not fully opened, the vibration of the operation rod 51 is suppressed regardless of the opening degree of the valve.

In addition, in the second embodiment, the other end of the compression coil spring 67 is disposed to contact the rear wall 65b of the bush housing 65, but for example, the other end of the compression coil spring 67 may be disposed to contact the inner wall surface of the front wall 59b of the high pressure side cup portion 59. Further, the compression coil spring 67 may be provided at a plurality of positions. For example, the compression coil spring may be disposed at the outside of the operation rod 51 so that the operation rod 51 is not inserted therethrough.

A length of the compression coil spring 67 in the axial direction may be shorter than a distance between the rear wall 65b and the retainer body 62a. For example, a configuration may be also employed in which the other end of the compression coil spring 67 is attached to the rear wall 65b and one end of the compression coil spring 67 is disposed to be separated from the retainer body 62a. In the case of this configuration, when a movement amount of the diaphragm 53 toward the high pressure chamber 55 increases, the retainer body 62a and the compression coil spring 67 contact each other so that the vibration of the high pressure side retainer 62 is reduced.

A configuration may be also employed in which one end of the compression coil spring 67 is attached to the retainer body 62a and the other end of the compression coil spring 67 is disposed to be separated from the rear wall 65b. In the case of this configuration, when a movement amount of the diaphragm 53 toward the high pressure chamber 55 increases, the rear wall 65b and the compression coil spring 67 contact each other so that the vibration of the high pressure side retainer 62 is reduced.

Third Embodiment

Figure 6:
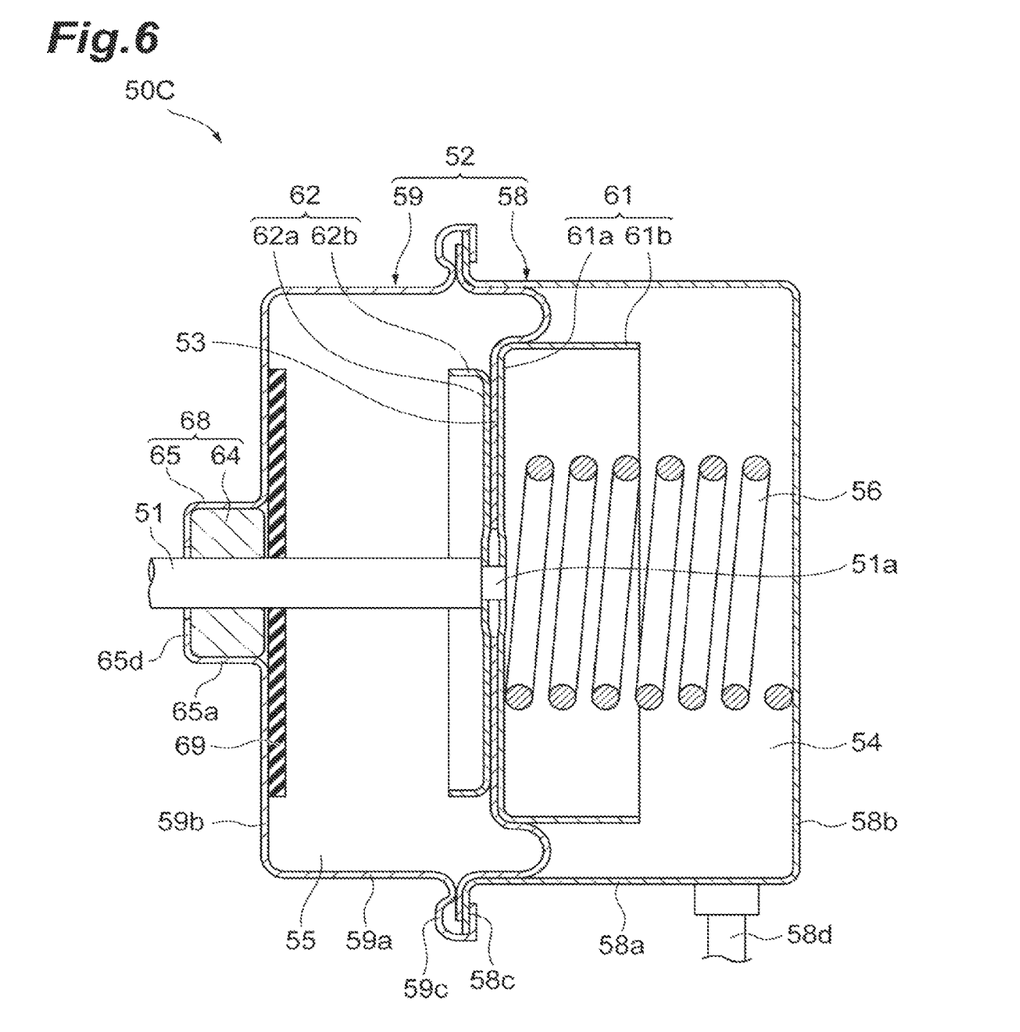
FIG. 6 is a cross-sectional view of a diaphragm-type actuator according to a third embodiment of the disclosure.

Next, a diaphragm-type actuator 50C according to a third embodiment will be described with reference to FIG. 6. The diaphragm-type actuator 50C according to the third embodiment is different from the diaphragm-type actuator 50 of the first embodiment in that a bearing portion 68 disposed to protrude toward the outside of the high pressure chamber 55 from the front wall 59b is provided instead of the bearing portion 63 disposed to protrude toward the inside of the high pressure chamber 55 from the front wall 59b and an anti-vibration sheet 69 attached to the inner wall surface of the front wall 59b is provided instead of the anti-vibration sheet 66 attached to the rear wall 65b of the bush housing 65. Further, in the description of the third embodiment, the same description as those of the first and second embodiments will be omitted.

The bearing portion 68 includes the bush 64 and the bush housing 65. The bush housing 65 includes the cylindrical portion 65a and a front wall 65d. The cylindrical portion 65a is formed to protrude from the front wall 59b of the high pressure side cup portion 59 toward the other end side of the operation rod 51. One end side of the cylindrical portion 65a is continuous to the front wall 59b of the high pressure side cup portion 59. The front wall 65d of the bush housing 65 is formed at the other end side of the cylindrical portion 65a to protrude inward in the radial direction from the cylindrical portion 65a. A center portion of the front wall 65d is provided with an opening portion through which the operation rod 51 is inserted. The front wall 65d is disposed to cover the end surface of the other end side of the bush 64.

The anti-vibration sheet 69 is, for example, a disc-shaped rubber plate (a plate-shaped portion). A center portion of the anti-vibration sheet 69 is provided with an opening portion through which the operation rod 51 is inserted. Further, the outer diameter of, the anti-vibration sheet 69 is a dimension larger than the outer diameter of the protrusion portion 62b of the high pressure side retainer 62. The anti-vibration sheet 69 is attached to the front wall 59b by, for example, adhering.

In the diaphragm-type actuator 50C with this configuration, when a movement amount of the center portion of the diaphragm 53 toward the high pressure chamber 55 becomes maximal, the end surface of the protrusion portion 62b of the high pressure side retainer 62 contacts the anti-vibration sheet 69. Accordingly, when the vibration of the valve body 23 is transmitted to the diaphragm 53 and the high pressure side retainer 62, the vibration of the high pressure side retainer 62 and the diaphragm 53 is reduced by the anti-vibration sheet 69. For that reason, since the vibration of the operation rod 51 is suppressed, the vibration of the valve body 23 of the diaphragm-type actuator 50 is suppressed.

In addition, in the third embodiment, the anti-vibration sheet 69 is attached to the front wall 59b, but the anti-vibration sheet may be attached to, for example, the high pressure side retainer 62. For example, the anti-vibration sheet may be formed in an annular shape and may be disposed to cover the end surface of the protrusion portion 62b of the high pressure side retainer 62.

Fourth Embodiment

Figure 7:
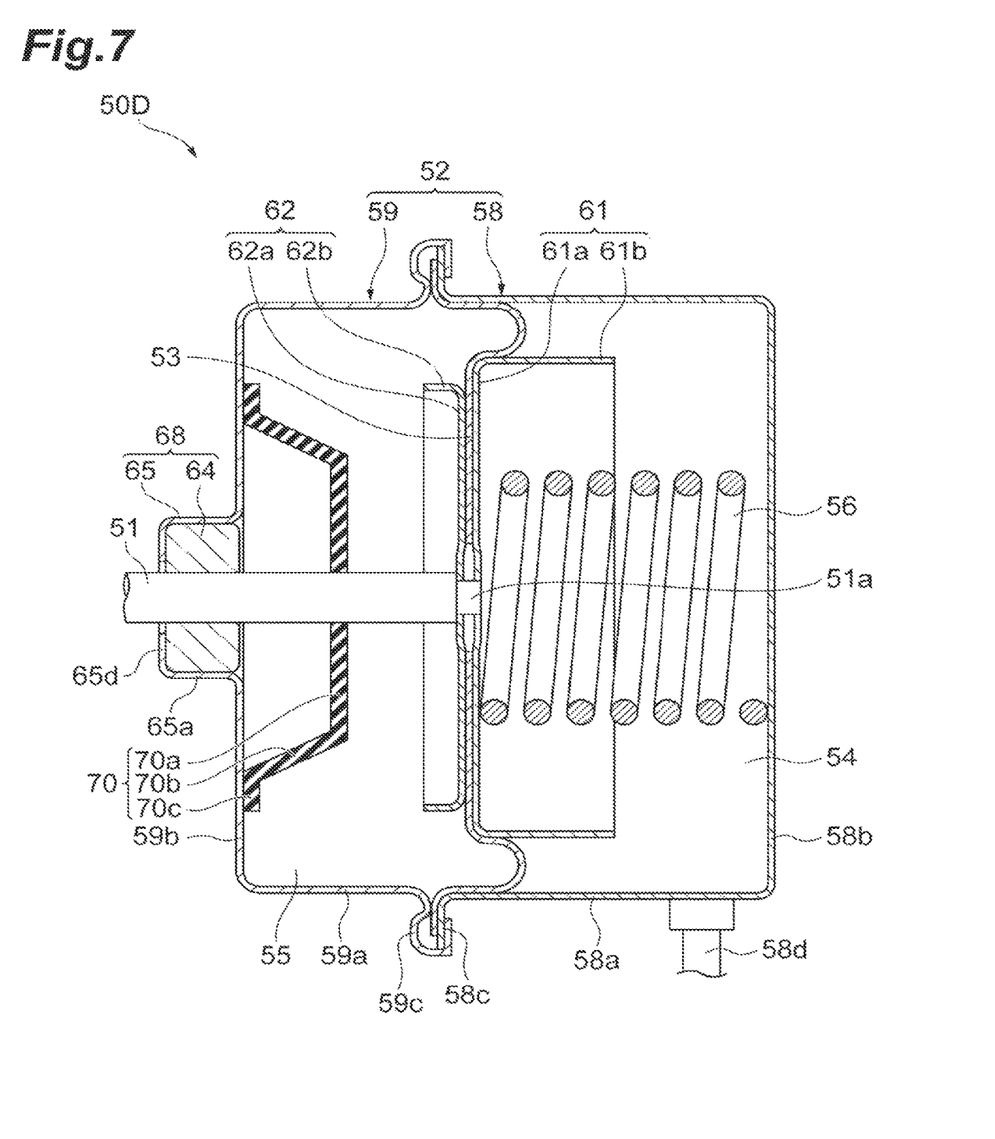
FIG. 7 is a cross-sectional view of a diaphragm-type actuator according to a fourth embodiment of the disclosure.

Next, a diaphragm-type actuator 50D according to a fourth embodiment will be described with reference to FIG. 7. The diaphragm-type actuator 50D according to the fourth embodiment is different from the diaphragm-type actuator 50C of the third embodiment in that an anti-vibration sheet 70 is provided instead of the anti-vibration sheet 69. Additionally, in the description of the fourth embodiment, the same description as those of the first, second, and third embodiments will be omitted.

The anti-vibration sheet 70 is, for example, a plate-shaped rubber member formed in a truncated conical mountain shape. The anti-vibration sheet 70 includes a rear surface portion (a plate-shaped portion) 70a which is formed in a disc shape and is disposed to be separated from the front wall 59b, a cylindrical portion (an extension portion) 70b which extends toward the front wall 59b from an outer circumferential edge of the rear surface portion 70a, and a flange portion 70c which protrudes outward in the radial direction from an end near the front wall 59h in the cylindrical portion. 70b.

The rear surface portion 70a is disposed near the diaphragm 53 while being separated from the front wall 59b in the axial direction of the operation rod 51. A predetermined space is formed between the rear surface portion 70a and the front wall 59b. A center portion of the rear surface portion 70a is provided with an opening portion through which the operation rod 51 is inserted. The rear surface portion 70a forms a wall surface facing the high pressure side retainer 62 in the axial direction of the operation rod 51. The outer diameter of the rear surface portion 70a is, for example, a dimension smaller than the inner diameter of the protrusion portion 62b of the high pressure side retainer 62.

The cylindrical portion 70b is forming in a conical shape and an inner diameter thereof increases as it moves closer to the front wall 59h. In the axial direction of the operation rod 51, one end of the cylindrical portion 70b is connected to the rear surface portion 70a and the other end of the cylindrical portion 70b contacts the inner wall surface of the front wall 59b. The outer diameter of the other end of the cylindrical portion 70b is a dimension larger than an outer diameter of one end thereof and is smaller than, for example, the inner diameter of the protrusion portion 62b of the high pressure side retainer 62.

The flange portion 70c is disposed to face, for example, the protrusion portion 62b of the high pressure side retainer 62 in the axial direction of the operation rod 51. The flange portion 70c is attached to the inner wall surface of the front wall 59b by, for example, adhering. The outer diameter of the flange portion 70c may be a dimension larger than the outer diameter of the protrusion portion 62b of the high pressure side retainer 62 or a dimension smaller than the outer diameter of the protrusion portion 62b.

The anti-vibration sheet 70 can be formed by, for example, a plate-shaped rubber member. The anti-vibration sheet 70 can be formed by pressing a rubber member against a base forming a truncated conical mountain shape.

In the diaphragm-type actuator 50D with this configuration, when a movement amount of the center portion of the diaphragm 53 toward the high pressure chamber 55 becomes maximal, the retainer body 62a of the high pressure side retainer 62 contacts the rear surface portion 70a of the anti-vibration sheet 70. Accordingly, the vibration of the valve body 23 is transmitted to the diaphragm 53 and the high pressure side retainer 62 and the vibration of the high pressure side retainer 62 and the diaphragm 53 is reduced by the anti-vibration sheet 70. For that reason, since the vibration of the operation rod 51 is suppressed, the vibration of the valve body 23 of the diaphragm-type actuator 50 is suppressed.

In addition, in the fourth embodiment, the anti-vibration sheet 70 is attached to the front wall 59b similarly to the third embodiment, but the anti-vibration sheet 70 may be attached to, for example, the high pressure side retainer 62. For example, the outer diameter of the rear surface portion 70a of the anti-vibration sheet 70 may be larger than the outer diameter of the protrusion portion 62b of the high pressure side retainer 62 and the rear surface portion 70a may be disposed to cover the end surface of the protrusion portion 62b.

The mountain shape formed on the anti-vibration sheet 70 is not limited to a truncated conical shape. For example, the shape may be a cylindrical or rectangular parallelepiped shape.

Further, the side face of the mountain shape is not limited to a cylindrical shape and may include a plurality of leg-shaped extension portions arranged at intervals in the circumferential direction.

The anti-vibration sheet 70 includes the flange portion 70c, but may not include the flange portion 70c. Further, the anti-vibration sheet 70 may include a flange portion which is formed at an end near the front wall 59b in the cylindrical portion 70b to protrude inward in the radial direction or may include a disc-shaped front portion closing an end near the front wall 59b in the cylindrical portion 70b.

In addition, the invention is not limited to the above-described embodiments, and various modifications can be made as below without departing from the gist of the claims.

In the above-described embodiments, the diaphragm-type actuator 50 is used as a drive source for the waste gate valve 20 of the supercharger 1, but may be used as a drive source for opening and closing the other valves. Further, the diaphragm-type actuator 50 may be used as a drive source for driving an object other than the valve.

In the above-described embodiments, the anti-vibration sheets 66, 69, and 70 and the compression coil spring 67 are exemplified as the elastic member, but the elastic member may be, for example, other spring members such as a disc spring and a leaf spring. For example, a plurality of the same kind of spring members may be disposed to overlap one another in the axial direction of the operation rod 51 or a plurality of kinds of spring members may be disposed to overlap one another in the axial direction of the operation rod 51. For example, a plurality of the anti-vibration sheets 69 illustrated in FIG. 6 may overlap one another or a plurality of different kinds of anti-vibration sheets having different thickness or materials may overlap one another. Further, the anti-vibration sheet 70 may be disposed near the diaphragm 53 in the anti-vibration sheet 69. Further, the compression coil spring may be disposed near the diaphragm 53 in the anti-vibration sheets 66, 69, and 70 or the compression coil spring may be disposed near the front wall 59b in the anti-vibration sheets 66, 69, and 70.

In the above-described embodiments, a case in which the elastic member is attached to the rear wall 65b of the bush housing 65, a case in which the elastic member is attached to the front wall 59b of the high pressure side cup portion 59, and a case in which the elastic member is attached to the high pressure side retainer 62 have been exemplified, but the elastic member may be attached to other portions. For example, the elastic member may be attached to the inner circumferential surface of the cylindrical portion 59a of the high pressure side cup portion 59 or may be attached to the high pressure side cup portion 59 through other members.

In the above-described embodiments, the high pressure side retainer 62 includes the protrusion portion 62b which protrudes toward the inside of the high pressure chamber 55, but the high pressure side retainer 62 may not include the protrusion portion 62b which protrudes toward the inside of the high pressure chamber 55. Further, the protrusion portion 62b may not protrude from the outer circumferential portion of the retainer body 62a, but may protrude from an intermediate portion in the radial direction.

In the above-described embodiments, the supercharger 1 employing the waste gate valve 20 is used for the vehicle, but the supercharger is not limited to the application to the vehicle. For example, the supercharger may be used for a marine engine or other engines.

INDUSTRIAL APPLICABILITY

According to some aspects of the disclosure, since it is possible to suppress the vibration of the retainer and the diaphragm by the elastic member, it is possible to suppress the vibration of the operation rod connected to the diaphragm.

REFERENCE SIGNS LIST

1 supercharger
50, 50B, 50C, 50D diaphragm-type actuator
51 operation rod
52 actuator body
53 diaphragm
54 low pressure chamber
55 high pressure chamber
56 return spring
59b front wall (wall surface facing retainer)
62 high pressure side retainer
62b protrusion portion (rim) bearing portion
65b rear wall (wall facing retainer)
66, 69, 70 anti-vibration sheet (elastic member, plate-shaped rubber, truncated conical rubber)
67 compression coil spring (elastic member)
70a rear surface portion (plate-shaped portion)
70b cylindrical portion (extension portion)

The invention claimed is:
1. A diaphragm-type actuator that drives an operation rod in an axial direction of the operation rod, comprising:
 a diaphragm which is connected to the operation rod;
 a low pressure chamber which is adjacent to a first end side of the diaphragm in the axial direction;
 a high pressure chamber which is adjacent to a second end side of the diaphragm in the axial direction;
 a return spring which is provided in the low pressure chamber and urges the diaphragm toward the high pressure chamber;
 a retainer which is provided on a surface near the high pressure chamber in the diaphragm; and
 an elastic member that is disposed between the retainer and a wall surface facing the retainer so as to contact the retainer in the axial direction inside the high pressure chamber when a pressure in the low pressure chamber is greater than a predetermined value,
 wherein the operation rod extends from the diaphragm toward the high pressure chamber and penetrates a wall body facing the retainer of the high pressure chamber in the axial direction,
 wherein a bearing portion holding the operation rod is supported by the wall body and has a rear wall facing the retainer,
 wherein the bearing portion protrudes from the wall body into the high pressure chamber, and
 wherein the elastic member is attached to the rear wall of the bearing portion.
2. The diaphragm-type actuator according to claim 1, wherein the elastic member is formed by a rubber member and includes a plate-shaped portion which is disposed to face the retainer in the axial direction, and wherein a plate thickness direction of the plate-shaped portion is disposed to follow the axial direction.

3. The diaphragm-type actuator according to claim 1,
wherein the bearing portion includes a cylindrical bush and a bush housing which receives the cylindrical bush,
wherein the bush housing includes
   a cylindrical portion which is disposed to cover an outer circumferential surface of the cylindrical bush,
   the rear wall which is formed at a first end of the cylindrical portion in the axial direction, and
   a flange portion which is formed at a second end of the cylindrical portion in the axial direction, the flange portion being fixed to the wall body, and
wherein the cylindrical bush is disposed between the wall body and the rear wall in the axial direction.

4. A diaphragm-type actuator that drives an operation rod in an axial direction of the operation rod, comprising:
   a diaphragm which is connected to the operation rod at a first end thereof;
   a low pressure chamber which is adjacent to a first end side of the diaphragm in the axial direction;
   a high pressure chamber which is adjacent to a second end side of the diaphragm in the axial direction;
   a return spring which is provided in the low pressure chamber and urges the diaphragm toward the high pressure chamber;
   a retainer which is provided on a surface near the high pressure chamber in the diaphragm; and
   an elastic member that is disposed between the retainer and a wall surface facing the retainer so as to contact the retainer in the axial direction inside the high pressure chamber when a pressure in the low pressure chamber is greater than a predetermined value,
wherein the operation rod extends from the diaphragm toward the high pressure chamber and penetrates the wall surface facing the retainer of the high pressure chamber in the axial direction,
wherein a bearing portion holding the operation rod is supported by the wall surface, the bearing portion including a cylindrical bush and a bush housing which receives the cylindrical bush, the bush housing including a cylindrical portion which protrudes from the wall surface toward a second end of the operation rod, a first end of the cylindrical portion in the axial direction being continuous with the wall surface, and a front wall formed at a second end of the cylindrical portion in the axial direction, and
wherein the elastic member is attached to the wall surface.

5. The diaphragm-type actuator according to claim 4,
wherein the elastic member is formed by a rubber member and includes a plate-shaped portion which is disposed to face the retainer in the axial direction, and
wherein a plate thickness direction of the plate-shaped portion is disposed to follow the axial direction.

6. The diaphragm-type actuator according to claim 5,
wherein the elastic member includes an extension portion which extends from the plate-shaped portion toward the second end of the extension rod.

* * * * *